(12) United States Patent
Watanabe et al.

(10) Patent No.: US 6,811,530 B2
(45) Date of Patent: Nov. 2, 2004

(54) BAG MANUFACTURING FORMER LAMINATED FILMS

(75) Inventors: Hiroaki Watanabe, North Kingstown, RI (US); Hiroyuki Inoue, Otsu (JP)

(73) Assignee: Toray Plastics America, Inc., North Kingstown, RI (US)

( * ) Notice: Subject to any disclaimer, the term of this patent is extended or adjusted under 35 U.S.C. 154(b) by 0 days.

(21) Appl. No.: 10/382,434

(22) Filed: Mar. 6, 2003

(65) Prior Publication Data

US 2004/0176230 A1 Sep. 9, 2004

(51) Int. Cl.$^7$ ................................................. B31C 5/00
(52) U.S. Cl. ........................ 493/269; 493/291; 493/309
(58) Field of Search ........................... 493/269, 291, 493/309, 157, 155

(56) References Cited

U.S. PATENT DOCUMENTS

| | | | | |
|---|---|---|---|---|
| 3,042,103 A | * | 7/1962 | McDevitt et al. | 156/466 |
| 3,486,424 A | * | 12/1969 | Tanner | 493/468 |
| 3,636,826 A | * | 1/1972 | Bowen et al. | 493/417 |
| 4,532,754 A | * | 8/1985 | Hokanson | 53/451 |
| 4,950,345 A | * | 8/1990 | Kreager et al. | 156/203 |
| 6,589,147 B2 | * | 7/2003 | Dominguez et al. | 493/269 |

* cited by examiner

Primary Examiner—Eugene Kim
Assistant Examiner—Sameh H. Tawfik
(74) Attorney, Agent, or Firm—Morrison & Foerster LLP (57) ABSTRACT

A former is used to manufacture a bag in a packaging machine. The radius of curvature of the former top along a film guiding direction is between 0.27 mm and 0.50 mm, the average surface roughness of the former top is less than 10 µm, and the number of high projections per unit length of 10 mm of the former top along a width direction of the film guided by the collar into the cylinder. The high projection is defined as a projection of the surface of the former top that is as tall as or taller than 5 times the average surface roughness of the former top. It is found that the minimum radius of curvature of the former top should be equal to or larger than the critical radius that is defined by a radius of the curvature which causes an elastic limit strain at an innermost portion of a support layer of a laminated film immediately outside a barrier layer of the laminated film when the laminated film is bent over the former top. This makes it possible to effectively avoid undesired increase in oxygen transmission of the bag made of the laminated film.

8 Claims, 6 Drawing Sheets

| | Min R [mm] | Max R [mm] | Roughness Ra [µm] | High projections (h ≥ 5.0 Ra) [ /10mm] | O2TR [cc/m²/day] | Stripe defects |
|---|---|---|---|---|---|---|
| Former 1 | 0.27 | 0.50 | 9.5 | 4 | 6 | None |
| Former 2 | 0.37 | 0.50 | 8.4 | 3 | 5 | None |
| Comparison 1 | 0.18 | 0.66 | 15.5 | 16 | 84 | Observed |
| Comparison 2 | 0.28 | 0.47 | 12.7 | 8 | 23 | None |
| Comparison 3 | 0.40 | 0.58 | 9.2 | 3 | 6 | Observed |

BAG MANUFACTURING FORMER LAMINATED FILMS

BACKGROUND OF THE INVENTION

1. Field of the Invention

The invention relates to a former for use in a packaging machine for manufacturing and filling bags. This invention also relates to laminated gas barrier films.

2. Description of the Related Art

In preserving food or medicine during a relatively long time period, it is necessary to form packaging which can provide an excellent gas barrier properties capable of completely shutting out oxygen and water vapor (both of which can enhance decay and alteration of food or medicine) coming from the outside air. Packaging materials having excellent gas barrier properties for achieving this purpose include polypropylene and polyester films coated with a metal layer or a metal oxide layer, such as aluminum, alumina or silica. Another known materials which can be used for the same purpose are laminated gas barrier films formed by laminating together the above coated films and other films. All of these films are suitable for use in packaging snack confectionaries.

Conventionally, the aforesaid packaging is performed by using a bag-manufacturing/filling packaging machine which intermittently feeds out rolled films and transports them to a former which transforms the film into a bag.

However, with regard to the laminated gas barrier films made of commonly used packaging materials, in designing the thickness and the elastic modulus of these barrier films stresses acting on the barrier layers, which may cause crack formation in the barrier layer, are not taken into account. As a result, when bags are manufactured in the bag-manufacturing/filling packaging machine, the films passing through the top of the former will be greatly bent, and some cracks will thus occur in aluminum-coated layers (which are in fact barrier layers). This leads to a large reduction in gas barrier properties.

High barrier metallized OPP (Oriented Polypropylene) films are typically metallized to an optical density range of 2.0–2.4. This has been shown to be adequate to provide good flat sheet (non-elongated) barrier properties. However, such an optical density level has not been shown to provide good barrier durability during the bag forming process.

U.S. Pat. No. 5,698,317, entitled "Polyolefin-based laminated film", discloses the use of four layer packaging film having a polyolefin resin layer sandwiched between a polyolefin mixed resin layer comprising a petroleum or terpene resin and a heat sealable layer or non-sealable winding layer. A metal layer is then deposited on the surface of the polyolefin mixed resin layer. The metal layer is deposited following the discharge treatment of the polyolefin mixed resin layer. The disclosure of U.S. Pat. No. 5,698,317 is, in its entirety, incorporated herein by reference.

U.S. Pat. No. 4,297,187, entitled "Surface treatment of plastic material," discloses the use of a discharge treatment method on a plastic surface in a controlled atmosphere of $N_2$ and $CO_2$. The disclosure of U.S. Pat. No. 4,297,187 is, in its entirety, incorporated herein by reference.

Commonly owned copending U.S. patent application Ser. No. 09/715,013 (International Publication No. WO 00206043), entitled "BIAXIALLY ORIENTED POLYPROPYLENE METALIZED FILM FOR PACKAGING", discloses the use of a high optical density aluminum layer with a specific structure of aluminum and aluminum purity. The disclosure of U.S. patent application Ser. No. 09/715,013 is, in its entirety, incorporated herein by reference.

Commonly owned copending U.S. patent application Ser. No. 60/357,837, entitled "BIAXIALLY ORIENTED POLYPROPYLENE HIGH BARRIER METALIZED FILM FOR PACKAGING" discloses the use of a high crystalline polypropylene resin of 93–98% isotactic content with high optical density. The laminate film described in this application includes a high crystalline propylene homopolymer resin layer of greater than about 93% isotactic content having a first surface and a second surface, a polyolefin resin layer disposed on the first surface and having a discharge-treated surface, a metal layer having an optical density of at least about 2.6 deposited on the discharge-treated surface of the polyolefin resin layer, and a heat sealable layer or a winding layer disposed on the second surface. This laminate film has shown very good barrier properties.

This invention improves upon the moisture and gas barrier properties of the film as well as the durability of the metal layer.

During the bag manufacturing process, although there is usually a tensile stress of about 1–50 $kgf/m^2$ acting on the films, such a stress may be set at a low level so as to reduce the maximum stress acting on the barrier layers. Further, although a typical bag manufacturing speed is 50–200 bags per minute (the length of each bag is about 150–400 mm), it is possible to avoid an excessive tensile force caused by a sudden impact during the intermittent feeding of the films. This can be achieved by using a roll assembly, setting a low tensile force, reducing the feeding speed for sending films for manufacturing bags, to reduce the tensile forces acting on the laminated films.

However, if the barrier property is to be improved by laminating together several specific material layers, it is necessary to provide an additional step for manufacturing gas barrier films, hence increasing the production cost. On the other hand, even if merely the rigidity of the films is improved, distortions will occur in the films when they are bent over the former. As a result, cracks will appear in the barrier layers, making it difficult to prevent deterioration of barrier properties during the bag manufacturing process. Furthermore, lowering the tensile force during the bag manufacturing process will cause zigzag and wrinkle formation in the films, while decreasing the film sending speed in the bag manufacturing process will cause a decrease in the productivity of the bag-manufacturing/filling process. Accordingly, none of these measures are effective.

SUMMARY OF THE INVENTION

The invention provides a former for use in a bag manufacturing and bag filling packaging machine. The former includes a cylinder, a collar for guiding a film into the cylinder and a former top. The minimum radius of curvature of the former top along a film guiding direction is equal to or larger than 0.27 mm, the maximum radius of curvature of the former top along the film guiding direction is equal to or smaller than 0.50 mm, the average surface roughness of the former top is less than 10 $\mu$m, and the number of high projections per unit length of 10 mm of the former top along a width direction of the film guided by the collar into the cylinder is less than five. A high projection is defined as being a projection of the surface of the former top that is as tall as or taller than 5 times the average surface roughness of the former top.

The invention also provides a method for manufacturing a bag that includes providing a laminated film comprising a gas barrier layer and support layers disposed on both sides of the gas barrier layer and forming the laminated film into a bag by guiding the laminated film over a former top of a former. The minimum radius of curvature of the former top along a film guiding direction is between a critical radius and 0.5 mm. The critical radius is defined as being the radius of the curvature of the former top which causes an elastic limit strain at an innermost-portion of the support layer immediately outside the barrier layer when the laminated film is bent over the former top. Furthermore, the elastic limit strain is defined as being the minimum strain which causes the support layer to yield or break.

The invention further provides a laminated film to be fed in a film feeding direction, which includes a first support layer, a second-support layer and a gas barrier layer attached to a surface of the first support layer that is closer to the second support layer. The strain along the feeding direction at the innermost portion of the first support layer is less than an elastic limit strain along the feeding direction of the first support layer when the laminated film is bent so that the second support layer is inwardly folded and the minimum radius of the innermost portion of the bent second support layer is 0.2 mm.

The invention also provides a laminated film to be fed in a feeding direction, which includes a first polymer layer, a gas barrier layer disposed on the first polymer layer, a second polymer layer disposed on the gas barrier layer, and a third polymer layer. The following formula is satisfied:

$$(t1/t3) \geq (68.4 \times t2 + 1.3) \times (E1/E3)^{-0.8}$$

wherein t1 is the thickness of the first polymer layer, t2 is the thickness of the second polymer layer, t3 is the thickness of the third polymer layer, E1 is the elastic modulus of the first polymer layer along the feeding direction, and E3 is the elastic modulus of the third polymer layer along the feeding direction.

DETAILED DESCRIPTION OF THE INVENTION

Figure 1:
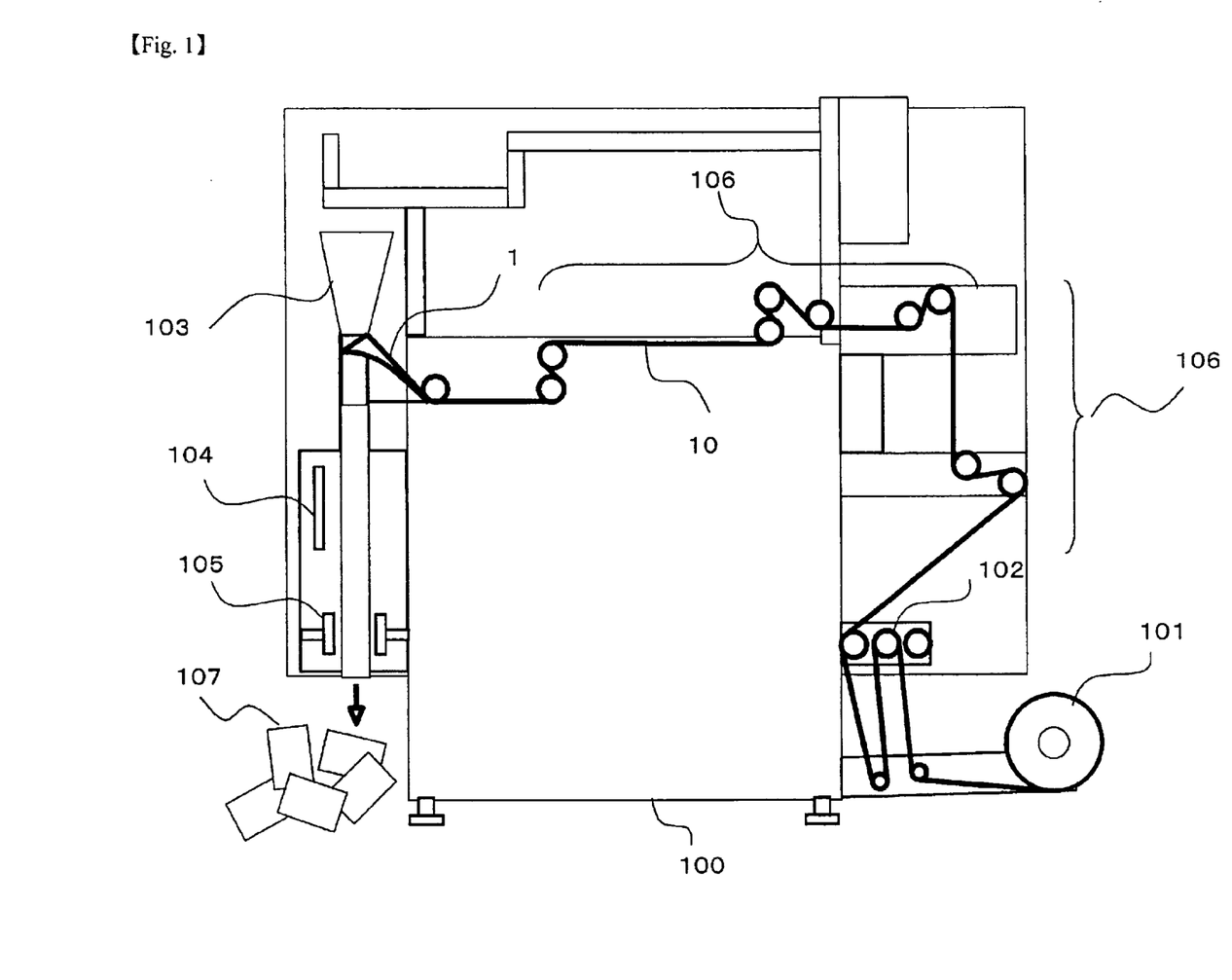
FIG. 1 is a side view showing a bag manufacturing/filling packaging machine used with formers of embodiments of this invention.

FIG. 1 is a side view showing a bag manufacturing/filling packaging machine used with the formers and the laminated films of this invention. As shown in the drawing, a plurality of guide rollers 106 are provided on a base section 100 for guiding and transporting the gas barrier films. Rolled and laminated films 101 are rotatably supported on a reel section, and laminated films 10 fed out from the rolled and laminated films 101 are caused to pass through a roll assembly 102, for relieving the impact which occurs at the start of the operation, and a group of guide rolls 106, to guide the film into a former 1.

Hopper 103 is used to introduce bag contents and communicates with the interior of the former 1. The laminated films 10 formed into a cylindrical shape in the former 1 are fused together at their edges by a seam seal 104, and further fused together at their bottom portions by end seals 105, thus making a bag. In this way, the contents are introduced through the hopper 103, while the end seal 105 is moved downwardly, with laminated films interposed between end seals 105. Once the process of forming one bag is finished, the laminated films 10 are cut by a cutter which is located in the vicinity of the end seals 105 (not shown in the drawing). Then, the laminated films are released, while the end seal 105 are moved back into its original position, to conclude one process. Subsequently, by repeating the above process, a predetermined amount of contents is packed into a plurality of bags which are in turn cut off from each other, so as to form separated bags 107 filled with the contents, which are then transported by a conveyer (not shown) to a next process.

Figure 2:
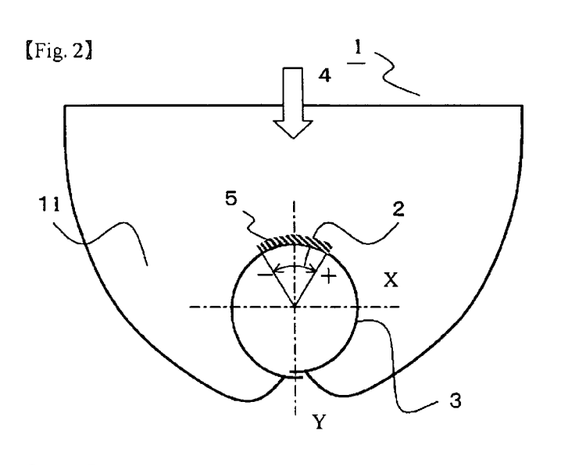
FIG. 2 is a plan view showing a former according to embodiments of the invention.
Figure 3:
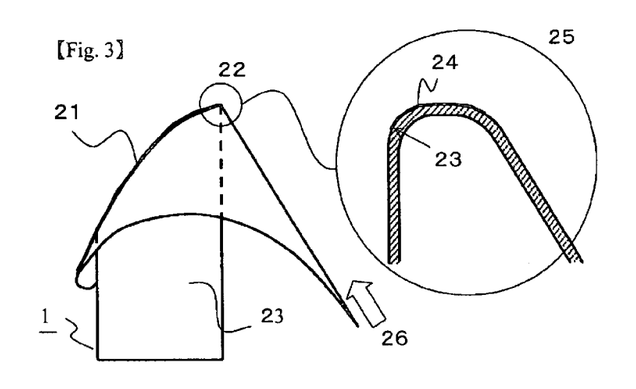
FIG. 3 is a side view showing the former of FIG. 2, with a magnified view of the former top.

FIGS. 2 and 3 are a top view and a side view, respectively, of a former 1 that show the general movement of a film for bag formation. A film which is to be formed into a bag is fed to the former 1 along its collar 11 in the direction shown in the figures (4 in FIG. 2 and 26 in FIG. 3). Typically, the width of the film is as large as the width of the collar 11 at its film-receiving end. The film moves up the collar 11 of the former 1 and then falls into the opening 21 of the cylinder 3 of the former 1. A central cylinder angle 2 is defined as follows, based on the configuration shown in FIG. 2. When viewed from the top, the cylinder 3 of the former 1 has substantially a circular shape. The line passing through-the top 22 of the former 1 in the feeding direction 4 provides a reference. The central cylinder angle is defined as the angle made between this reference line and a line connecting a point on the projected cylinder circle and the center of the circle, with the clockwise direction being defined as a positive direction. This definition can be applied even when the projected shape of the cylinder is not a circle. In FIG. 2, the reference line corresponds to the Y direction and the line perpendicular to the reference line corresponds to the X direction.

We have found that an important reason responsible for gas barrier property deterioration is the distortion which occurs when the laminated films are forced to bend over the top of the former 1, with the distortion causing cracks in the barrier layers. In particular, a strong tensile force occurs in the vicinity 5 of the center of the former (shown in FIG. 2), causing crack formation. Further, a smaller radius of curvature 23 on a top of the former (shown in FIG. 3) and a large surface roughness at the top of the former will produce cracks with a higher frequency. In order to solve this problem, we found it effective, when conventional laminated films for bag formation are used, to increase the radius of curvature on the top of the former or to reduce the surface roughness thereof. However, if there is an excessive increase in the radius of curvature on the top of the former, wrinkles will occur in the films, causing a stripe defect.

On the other hand, if the radius of curvature on the top of the former is to be adjusted and the surface roughness thereof is to be improved, there will be an increase in the total production cost. For this reason, it is required that any improvement be effected within an area which is as small as possible on the top of the former. We have found that the portion of the top 22 of the former 1 causing barrier property deterioration is the portion 5 defined by the central cylinder angles between +30 degrees and −30 degrees based on experiments on the formers and numerical calculations. This top portion is shown in the expanded view 25 in FIG. 3 as a former top 24, which acts as a film bending corner that changes the direction of the film propagation. Accordingly, the former top 24, throughout this specification, refers to the portion of the top of the former 1 which is located between +30 degrees and −30 degrees of the central cylinder angles and changes the direction of the film propagation. Further, based on experiments in which bags are manufactured from laminated films, we have determined some preferred ranges for the radius of curvature and the surface roughness of the former top.

As a method for adjusting the radius of curvature of the former top 24, a file is used to grind the former top 24. Any commonly used chamfering process may also be used. Another method which can be used for the same purpose is to weld a wire having a diameter of 0.37–0.5 mm to the former top 24.

Here, the surface roughness is defined as the difference between a maximum height and a minimum height at a standard measuring length of 2.5 mm. In order to reduce the surface roughness to 10 $\mu$m or less, sand papers having a particle size of 400 may be used to polish (as a final finishing treatment) at least an area corresponding to the former top. Some other processes to be carried out afterwards may include buff polishing treatment, lapping treatment using an amount of lap powder having a particle size of 400 grit, as well as a sand blasting treatment. By having a surface roughness within this range, it is possible to reduce friction between the films and the former top, thereby reducing local stresses acting on the films. Further, in order to improve wear resistance and to reduce the coefficient of friction, it is preferable to perform a surface smoothing treatment, such as DLC (Diamond-like Carbon) coating, TiN (titanium nitride) coating, or fluorine resin (PTFE: polytetrafluoroethylene) coating. The most desirable method is to perform a surface treatment to obtain a smooth surface which has only a small coefficient of friction, such as the fluorine resin coating treatment which is often used in processing the surface of a fry pan.

In a first embodiment of this invention, two formers are chamfered by a file and subsequently buff polished so that the minimum radius of the former top falls between 0.27 and 0.50 mm and the average roughness of the former top is less than 10 $\mu$m. Furthermore, observations of the former top of the first embodiment showed that there were less than five high projections in an unit length of 10 mm along the X direction of the former top.

Figure 4:
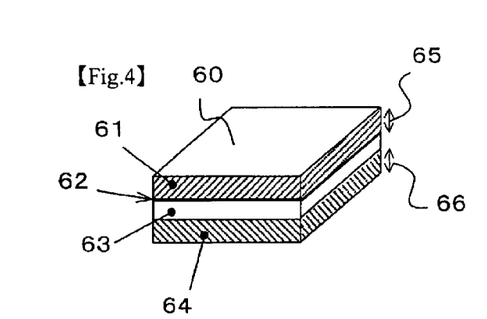
FIG. 4 is a schematic perspective view showing a laminated film containing a barrier layer, according to the embodiments of the invention.

When these formers were employed to manufacture bags using conventional laminated films 60 having the structure shown in FIG. 4, including an OPP layer 61 (serving as a first polymer layer), a barrier layer 62, a PE layer 63 (serving as a second polymer layer) and an OPP layer 64 (serving as a third polymer layer), it was found that the oxygen transmission after the bag manufacturing was 6 cc/day/m$^2$ which was almost the same (almost not deteriorated) as that before the bag manufacturing (5 cc/day/m$^2$). These characteristics of the two formers (Formers 1 and 2) of the first embodiment are summarized in FIG. 5.

Figure 5:
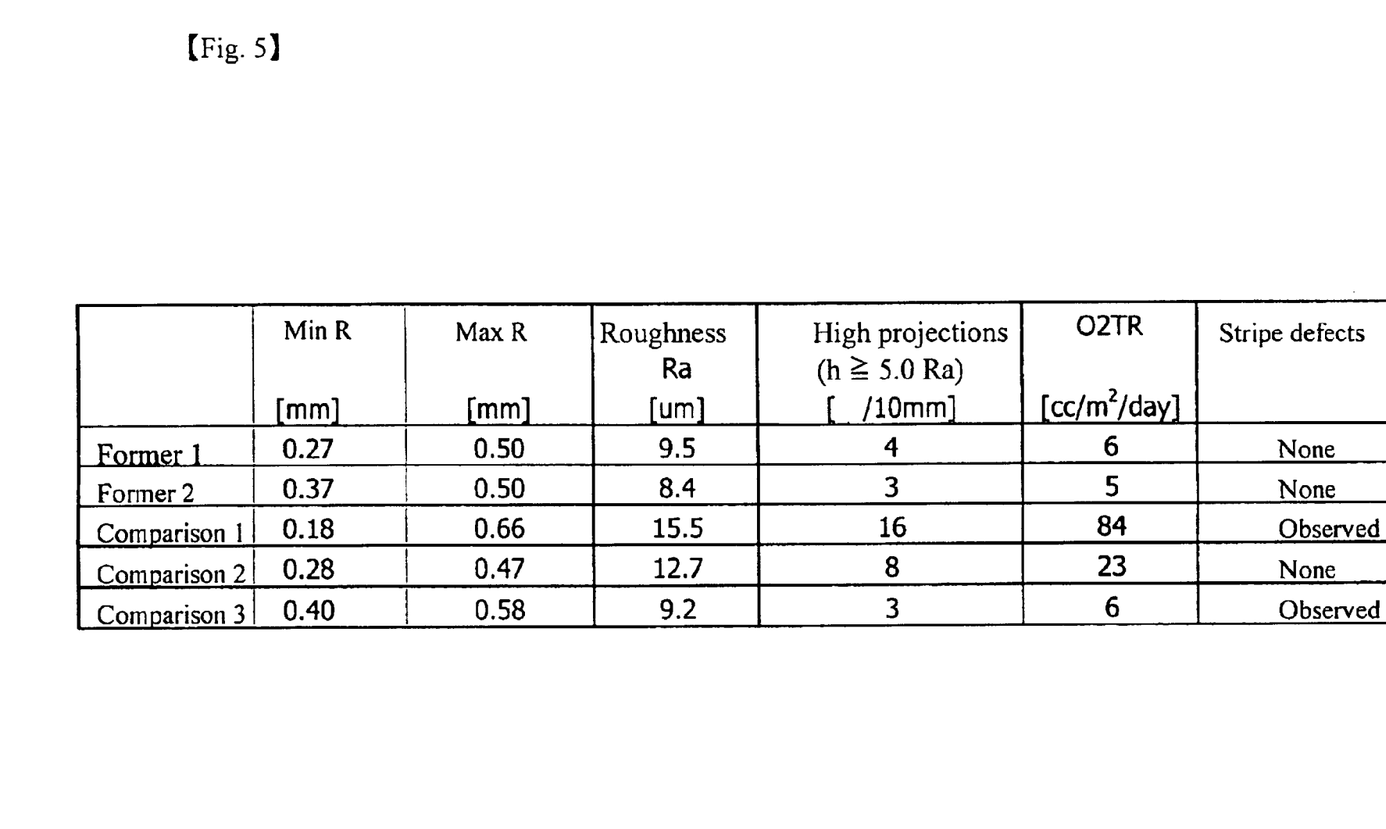
FIG. 5 shows the results of bag manufacturing with a former of a first embodiment of this invention together with the results of bag manufacturing with conventional formers.

We also examined two other types (comparisons 1 and 2) of conventional formers and found that the larger surface roughness including the larger number of the high projections contributed to the increased oxygen transmission rate, as shown in FIG. 5. The conventional former 1 (comparison 1) has a minimum radius of curvature of 0.18 mm, a maximum radius of curvature of 0.66 mm and an average surface roughness of about 15.5 $\mu$m. The number of the high projections per unit length of 10 mm along the X direction of the former top was 16.

The average oxygen transmission rate of the bag formed by this former was 84 cc/day/m$^2$. The conventional former 2 (comparison 2) has a minimum radius of curvature of 0.28 mm, a maximum radius of curvature of 0.47 mm, and an average surface roughness of about 12.7 pain. The number of the high projections per unit length of 10 mm along the X direction of the former top was 8. The average oxygen transmission rate of the bag formed by this former was 23 cc/day/m$^2$.

We also prepared another former (comparison 3) that has characteristics similar to former 2 of this embodiment except for a large maximum radius of curvature. Even thought the oxygen transmission rate of films produced suing this former is as small as those of formers 1 and 2, the former of comparison 3 produced bags with stripe defects because of the large maximum radius of curvature.

Figure 6:
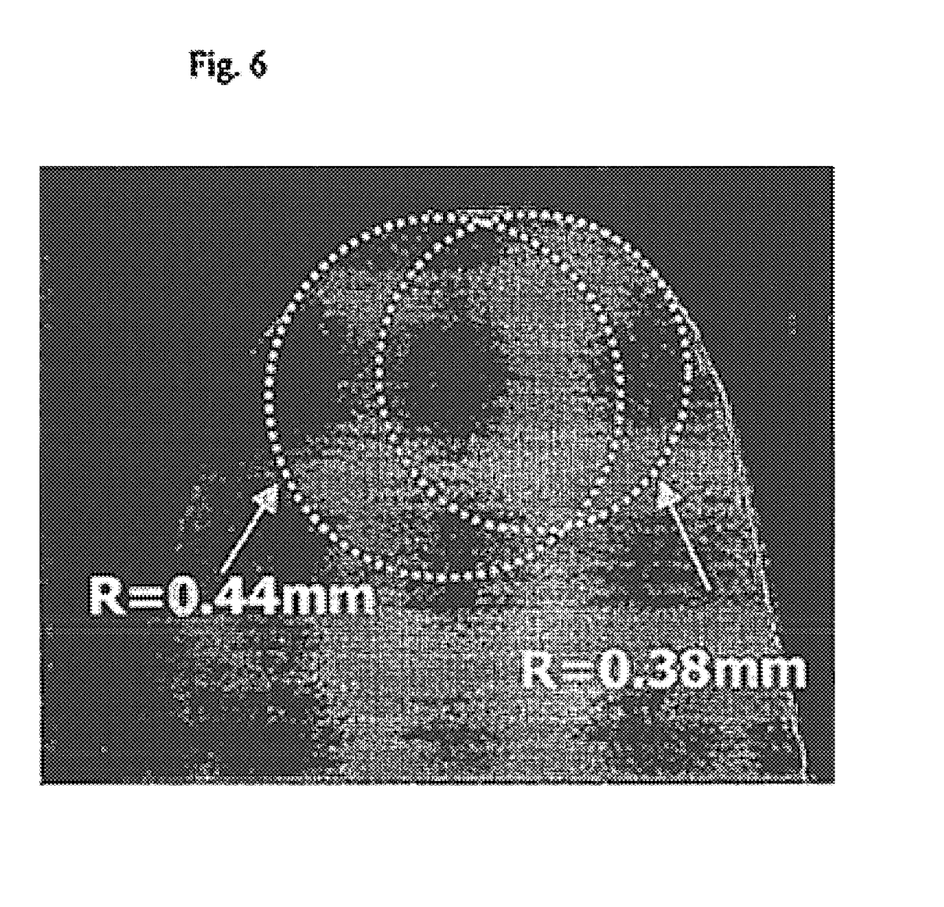
FIG. 6 shows the measurement procedure of the radius of curvature of the former top of the first embodiment.

The curvature of the former top was measured as follows:

First, a cube (1.0 cm×1.0 cm×1.0 cm) of a paraffin wax was heated in a oven at 60° C. for one minute, and pressed on the former top of a former for a measurement. After cooling, the wax covering the former top was sliced with a cutter along the film feeding direction (Y direction) with a pitch of about 1 mm along the X direction. A microscopic photograph of 50×magnification was taken for each slice, as shown in FIG. 6. A slice-minimum curvature of this slice, which corresponds to a position of the former top along the X direction, is defined as the minimum of the curvatures of the former top measured along the feeding direction (Y direction). Measured curvatures smaller than 0.01 mm were ignored. All of the curvatures measured had their centers of curvature within the former. Those having the centers outside the former were ignored.

The minimum radius of curvature of a former top of a former, such as the ones listed in FIG. 5, is defined as the minimum of the slice-minimum curvatures measured for the former top, each of which was measured from each wax slice as shown in FIG. 6.

A slice-maximum curvature is also determined for each slice in a similar manner. Measured values larger than 5 mm were ignored. The maximum radius of curvature of a former is defined as the maximum of the measured slice-maximum curvatures.

Other properties in the above examples were measured by the following methods:

A) Oxygen transmission rate of the film was measured by using a Mocon Oxtran 2/20 unit substantially in accordance with ASTM D 3985.

B) Optical density (OD) was measured using Tobias Associates model TBX transmission densitometer. Optical density is defined as the amount of light reflected from the test specimen under specific conditions. Optical density is provided in terms of a logarithmic conversion. For example, a density of 0.00 indicates that 100% of the light falling on the sample is being reflected. A density of 1.00 indicates that 10% of the light is being reflected; 2.00 corresponds to 1%, etc.

Figure 7A:
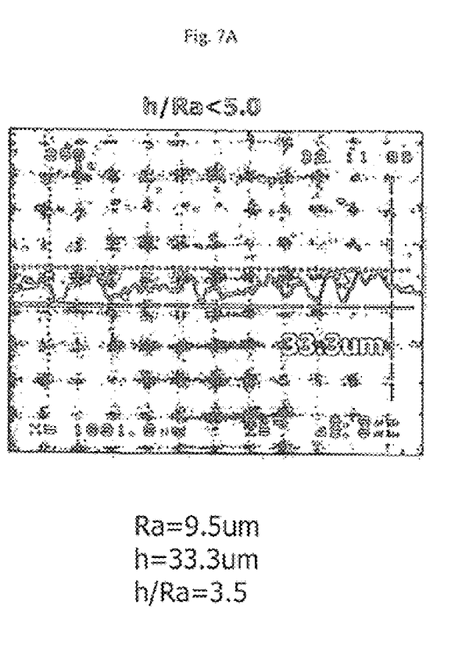
FIGS. 7A and 7B show examples of the surface roughness measurement of the former top of the first embodiment.
Figure 7B:
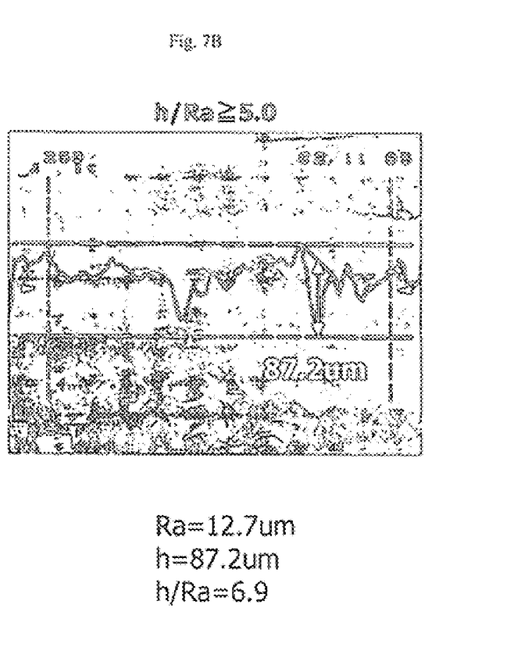

C) Surface roughness was measured using a digital laser microscope (VF7500, Keyence). A replica film made of acetyl cellulose (FRC, Bioden) was immersed in an acetone bath to become soft and flexible, and pressed on the former top. After the replica film hardened, the film was peeled off from the former top and mounted on a glass plate using an adhesive tape. The laser microscopic measurement on the replica film provided the surface topology and the average surface roughness Ra of the former top, as shown in FIGS. 7A and 7B. The magnification was 250× and a smoothing processing (IC) was employed for this measurement. The average surface roughness of one former top was the average of the multiple scanning of the replica film surface along the film feeding direction (Y direction) with a pitch of 0.1 mm and along the X direction with a pitch of 1.0 mm.

A projection having a height of about 33 $\mu$m is shown in FIG. 7A, but there is no high projection in this scanning. A projection having a height of about 87 $\mu$m is shown in FIG. 7B, and this is one of the high projections because it is taller than the average surface roughness by more than five times.

The gas barrier film used in this embodiment has a laminate structure of a first polymer layer/gas barrier layer/second polymer layer/third polymer layer, as shown in FIG. 4. The gas barrier layer is an aluminum film of OD=3.2, which is evaporated on the first polymer layer. The first and third polymer layers are made of a biaxially oriented polypropylene (OPP) film having an elastic modulus of 330,000 psi in the film feeding direction and having a thickness of about 15.2 $\mu$m. The second polymer layer is made of a polyethylene resin having a thickness of about 10.2 $\mu$m. To form the gas barrier film, the polyethylene of the second polymer is melted and extruded form a silt into the gap between the first polymer layer with the coated aluminum film and the third polymer layer so that the three polymer layers turn into the laminates structure.

The laminated films will bend when passing over the former top. In a second embodiment of this invention, which is a numerical calculation, we have also found that when an outer layer immediately adjacent to the barrier layers exceeds an elastic limit distortion in the film feeding direction, the crack formation is enhanced, resulting in an increased deterioration in the gas barrier property. In order to provide a former which can ensure an improved barrier property, we determined a critical radius (Ry) of curvature, at which the innermost portion of the outer layer immediately adjacent to the barrier layers reaches its elastic limit distortion in the film feeding direction, and then set the minimum value of the radius of curvature of the former top, which is responsible for the barrier property deterioration, to be equal to or higher than Ry. The value of Ry can be calculated using a numerical value analyzing method such as the finite element method.

In particular, we employed the finite element method as a numerical value analyzing method, and have divided into a plurality of fine elements a flat film at a stress-free state before receiving a bending deformation. In this finite element model, the surface of the former in contact with the film is taken-as a rigid (non-deformable) surface. There are a few different types of elements used in finite element method analysis, including a laminated shell element, a two-dimensional solid element and a three-dimensional solid element. We utilized 2-dimensional solid elements to divide the cross section of the films passing through the central portion of the former. Moreover, the elements are generated so that each film has at least two elements in the film thickness direction, while an element aspect ratio in the film feeding direction is 20 or lower, and an aspect ratio of an area receiving a bending deformation at the former top is 4 or lower. The material characteristics used with the elements include an elastic modulus, an elastic limit distortion and a process curing coefficient (using the methods which will be described in detail later), which are obtained using constitution equations of elasto-plastic materials, based on the results of a uni-axial tension test conducted in the longitudinal direction on the test pieces, which are cut out into a plurality of short strips from each single layer forming the laminated films. Here, the longitudinal direction is the film feeding direction. Then, a force corresponding to a tensile stress applied to the films during the bag manufacturing process is included in the model as an external force. Then, using the criteria that nodes forming the elements cannot pass through the rigid surface of the former, the Ry is determined, based on a repetitive calculation method, so that the external force matches the reaction force generated due to element deformation. We used commercially available software, ABAQUS by HKS, for performing the finite element method calculation.

In carrying out the above uni-axial tension test, a Tensilon tension testing device was employed. The film feeding direction is used as its longitudinal direction and, a force acting on the films which have been cut into short strips each having a width of 10 mm is converted into an electric output signal by a load cell with a strain gauge, thereby obtaining a relationship between a distortion and a force acting on the film pieces at room temperature. The elastic modulus is measured off the inclination in the stress-distortion graph thus provided.

The method for obtaining a material constant from the results of the uni-axial tension test should not be limited to the method description above. Any method may be used if one uses a stress-distortion graph representing the results of the test, such that a slope of a straight line connecting a distortion point of 0.5% with another distortion point of 1.5% is defined as an elastic modulus, while a slope of a straight line connecting a distortion point of 7% with another distortion point of 12% is defined as a process curing coefficient, with an intersection of the two straight lines being an elastic limit distortion.

Figure 8:
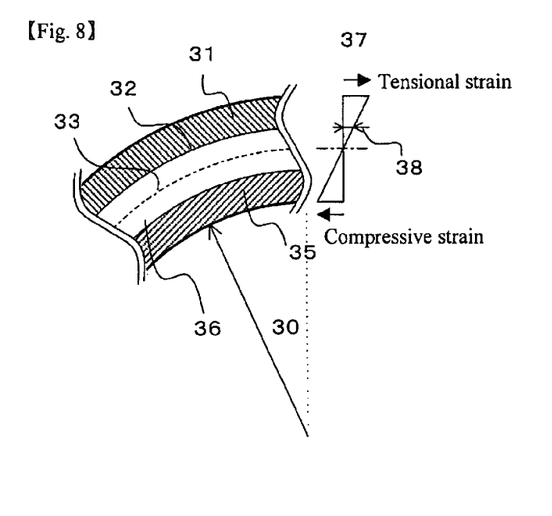
FIG. 8 is a schematic view showing a symmetrically laminated film, according to a second embodiment of the invention, under a bending deformation.
Figure 9:
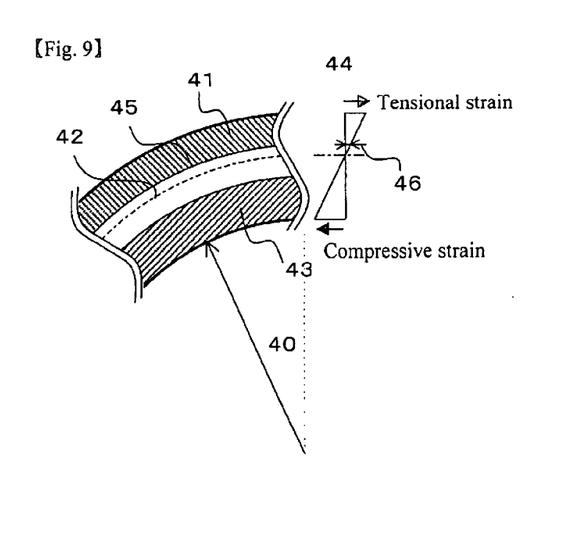
FIG. 9 is a schematic view showing a asymmetrically laminated film, according to the second embodiment, under a bending deformation.

Based on the findings and the discussion above, we conducted computer simulations, based on the film configuration shown in FIG. 4, to obtain a stress distribution under various conditions in which the laminated film is bent over a predetermined radius of curvature R, as shown in FIGS. 8 and 9. We found that if the minimum radius of curvature of the former top is 0.27 mm or smaller, the outer portions 61 of the barrier layer yields an elastic limit distortion. In other words, assuming the conventional laminated film structure of the first embodiment, the critical radius (Ry) is 0.27 mm for this film. This result is in a good agreement with the experimental data shown in FIG. 5. Accordingly, in this second embodiment, when the radius of curvature is larger than 0.27 mm, assuming the conventional laminated films of the first embodiment, the outside of the barrier layers will not reach the elastic limit, so that there is no remarkable decrease in barrier property.

As a third embodiment of this invention, we have generated design rules to create new laminated films for bag formation, assuming a conventional former having a minimum radius of curvature of 0.2 mm. Although the basic laminated structure of FIG. 4 was used in this embodiment, many design parameters, including the thickness and the elastic modulus, were varied from those of the first embodiment.

As shown in FIG. 8, the distortion of films receiving a bending deformation varies in the film thickness direction, i.e., changing from a tensile strain in the outside portion of the film to a compressive strain on the inside portion of the film. Further, when the elastic modulus of outer film 31 is equal to the elastic modulus of inner film 35, and when they are laminated in a symmetrical manner, a central axis 33 without any distortion is located at a central position in the film thickness direction. In this configuration, the thickness of the barrier layers is assumed to be sufficiently thin and their elastic moduli are assumed to be sufficiently small. Furthermore, the friction resistance on the inner surface is neglected. The strain represented by reference numeral 38 occurs in the innermost portion of the outer layer immediately adjacent to the barrier layer. Accordingly, based on the findings that cracks are formed with an increased frequency when the films are bent over the former top and when the distortion occurring in the innermost portion of the outer layer immediately adjacent to the barrier layers exceeds an elastic limit distortion, the barrier layer should be designed to be disposed in the film so that the distortion is equal to or lower than the elastic limit distortion. This leads to reduced crack formation and, thus, improved barrier property.

For example, when the rigidity of the outer film 41 is higher than that of the inner film 43, the center axis 42 moves in the film thickness direction toward the surface side (as shown in FIG. 6), thereby alleviating the distortion 46 of the barrier layers 45. Accordingly, the rigidity of the outer film is set to be higher than that of the inner film, such that when the film is bent over a curvature which is equal to the minimum radius at the former top, the distortion of the outer layer immediately adjacent to the barrier layers is equal to or lower than the elastic limit distortion.

As described above, since cracks are generally formed within the central cylinder angle of ±30 degrees, the direction of a tension acting on the laminated films mounted on the former, within this range, will be substantially the film travelling direction in the bag manufacturing/filling packaging machine. For this reason, with regard to the rigidity of the films, it is desirable to control within an appropriate range the rigidity ratio along the film travelling direction in the bag manufacturing/filling packaging machine.

Generally, in order to greatly increase the rigidity of biaxially oriented polypropylene, an elongation modifying agent such as petroleum resin is added to a homopolypropylene resin, thereby greatly increasing longitudinal elongation magnification in the film longitudinal direction (U.S. Pat. No. 5,667,902). Further, it is possible to use a homopolypropylene resin having a high crystalinity (U.S. patent application Ser. No. 60/357,837). In addition, it is also possible to use a simultaneous biaxial orienting technique (U.S. patent application Ser. No. 09/921322).

Using the basic laminated film structure of FIG. 4 but with the varying design parameters, we came up with formula 1 described below to establish the film designs for assuring high gas barrier properties. The minimum radius of 0.2 mm of the conventional former was used in this calculation. Furthermore, the first polymer layer is a polypropylene film, the gas barrier film is an aluminum-coated film, the second polymer layer is a polyethylene film, the third polymer layer is a polypropylene. However, the first polymer layer or the third polymer layer is not necessarily of a single layer structure, but may be of a multiple layer structure including a skin layer, which can be formed by coating or simultaneously extruding the laminated layers.

The numerical calculation required the following relationship among the design parameters of the laminated film:

$$(t1/t3) \geq (68.4 \times t2 + 1.3) \times (E1/E3)^{-0.8} \quad (1)$$

wherein $t1$ is a thickness of the first polymer layer, $t2$ is a thickness of the second polymer layer, $t3$ is a thickness of the third polymer layer, $E1$ is an elastic modulus of the first polymer layer along the feeding direction, and $E3$ is an elastic modulus of the third polymer layer along the feeding direction.

Figure 10:
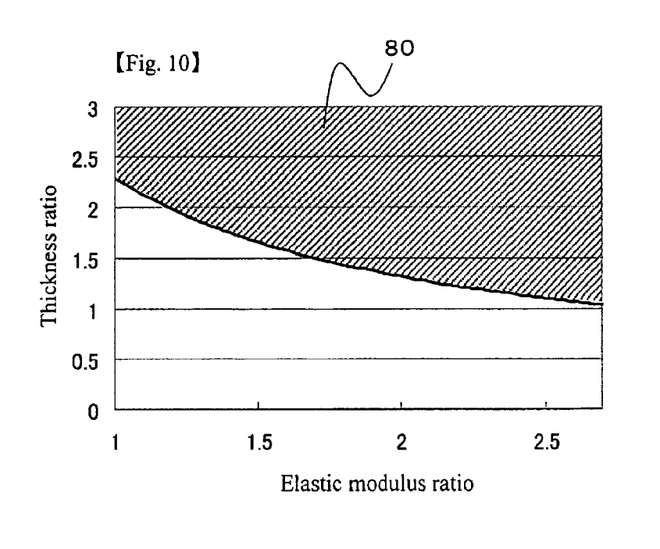
FIG. 10 shows a condition, in the third embodiment, in which strains generated in the outer OPP layer are equal to or less than 2%, using the ratio of the elastic modulus and the ratio of the thickness of the first and third polymer layers as parameters and assuming that the minimum radius of curvature at the former top is 0.2 mm.

The above relationship is obtained by numerical analysis using the finite element method to satisfy the condition that strains generated in the barrier layer are equal to or less than a yielding distortion of 2%, using the elastic modulus and the thickness of the first and third polymer layers as parameters and assuming that the minimum radius of the curvature at the former top is 0.2 mm. FIG. 10 shows a region represented by formula 1 as a function of a ratio of the elastic modulus and a ratio of the thickness. In this calculation, the thickness of the second polymer layer is 0.014 mm.

In this embodiment, the ratio of the elastic modulus of one polypropylene film (serving as the third polymer layer) in the film feeding direction to that of another polypropylene film (serving as the first polymer layer) was 1.3, the thickness ratio was 2.0, and the thickness of polyethylene laminated layers was 0.014 mm. In this configuration, the right side of the above formula 1 becomes (68.4×0.014+1.3)× 1.3−0.8=1.83, with a thickness ratio of 2.0. This satisfies formula 1. We formed a laminated film according to this configuration, and manufactured bags. It was found that the oxygen transmission was about 8 cc/day/m$^2$, thereby obtaining high quality packaging bags.

The films used in this embodiment may include a third polymer layer which is a commonly used biaxially oriented polypropylene film having an elastic modulus of 330,000 psi and a thickness of 12.7 µm, and a first polymer layer which is a different polypropylene film whose rigidity in its longitudinal direction was improved in a biaxial orientation apparatus, having an elastic modulus of 432,000 psi and a thickness of 25.4 µm.

What is claimed is:

1. A former for use in a bag manufacturing and bag filling packaging machine, comprising:

a cylinder;

a collar for guiding a film into the cylinder; and a former top, wherein a minimum radius of curvature of the former top along a film guiding direction is equal to or greater than 0.27 mm, a maximum radius of curvature of the former top along the film guiding direction is equal to or smaller than 0.50 mm, the average surface roughness of the former top is less than 10 µm, and the number of high projections per unit length of 10 mm of the former top along a width direction of the film guided by the collar into the cylinder is less than five, the high projection being defined as a projection of the surface of the former top that is as tall as or taller than 5 times the average surface roughness of the former top.

2. The former of claim 1, wherein the minimum radius of curvature is between 0.37 mm and 0.50 mm at the former top section.

3. The former of claim 1, wherein a minimum radius of curvature of the former top along a film guiding direction is between a critical radius and 0.5 mm, the critical radius being defined as being a radius of curvature which causes an elastic limit strain at an innermost portion of the support layer immediately outside the barrier layer when the laminated film is bent over the former top.

4. The former of claim 1, wherein the film with which the former is adapted to be used comprises a first support layer; a second support layer; and a gas barrier layer attached to a surface of the first support layer that is closer to the second support layer, wherein the laminated film is configured to yield a strain along the feeding direction at an innermost portion of the first support layer that is less than an elastic limit strain along the feeding direction of the first support layer when the laminated film is bent so that the second support layer is inwardly folded and a minimum radius of an innermost portion of the bent second support layer is 0.2 mm.

5. The former of claim 1, wherein the film with which the former is adapted to be used further comprises an intermediate layer disposed between the gas barrier layer and the second support layer.

6. The former of claim 5, wherein the first and second support layers of the film with which the former is adapted to be used comprise an oriented polypropylene and the intermediate layer comprises a polyethylene.

7. The former of claim 4, wherein the first support layer of the film with which the former is adapted to be used has a higher elastic modulus than the second support layer.

8. The former of claim 1, wherein the film with which the former is adapted to be used comprises:

a first polymer layer; a gas barrier layer disposed on the first polymer layer; a second polymer layer disposed on the gas barrier layer; and a third polymer layer, wherein the following formula is satisfied:

$$(t1/t3) \geq (68.4 \times t2 + 1.3) \times (E1/E3)^{-0.8}$$

wherein t1 is a thickness of the first polymer layer, t2 is a thickness of the second polymer layer, t3 is a thickness of the third polymer layer, E1 is an elastic modulus of the first polymer layer along the feeding direction, and E3 is an elastic modulus of the third polymer layer along the feeding direction.

\* \* \* \* \*